US007438231B2

(12) United States Patent
Cordery et al.

(10) Patent No.: US 7,438,231 B2
(45) Date of Patent: Oct. 21, 2008

(54) METHOD FOR DETECTING FORGED BARCODES

(75) Inventors: Robert A. Cordery, Danbury, CT (US); Bertrand Haas, New Haven, CT (US); Hongmei Gou, College Park, MD (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/543,496

(22) Filed: Oct. 5, 2006

(65) Prior Publication Data

US 2008/0110990 A1 May 15, 2008

(51) Int. Cl.
*G06K 7/10* (2006.01)

(52) U.S. Cl. ........................... 235/462.01; 235/462.11; 235/437; 235/462.09; 235/462.1; 235/462.41; 382/289; 382/296

(58) Field of Classification Search ................ 235/437, 235/462.09, 462.08, 462.1, 462.11, 462.41; 382/151, 289, 290, 296, 199, 204
See application file for complete search history.

(56) References Cited

U.S. PATENT DOCUMENTS 6,533,385 B1 3/2003 Mackay et al.
6,612,684 B2 9/2003 Mackay et al.
6,688,522 B1 * 2/2004 Philyaw et al. ......... 235/462.01

OTHER PUBLICATIONS

IEEE Transactions on Pattern Analysis and Machine Intelligence. vol. 12, No. 7 Jul. 1990 Scale-Space and Edge Detection Using Anisotropic Diffusion.

* cited by examiner

*Primary Examiner*—Michael G. Lee
*Assistant Examiner*—Rafferty Kelly
(74) *Attorney, Agent, or Firm*—Ronald Reichman; Angelo N. Chaclas

(57) ABSTRACT

A method of printing a two-dimensional barcode by tilting the print head, which results in tilted barcode, and methods of detecting various types of attempts to forge the tilted barcode including: (i) a low level forgery that consists of a simple scan and reprint of the barcode, (ii) a low level forgery that consists of a reproduction (i.e., a read and regeneration) and subsequent printing of the barcode using a printer with a non-tilted print head by a fraudster that is not aware of the tilt in the original barcode, and (iii) a higher level forgery by a fraudster that is aware of the tilt in the original barcode and that digitally tilts/shears an image of the barcode and prints the digitally tilted/sheared image using a printer with a non-tilted print head in an effort to mimic the tilt present in the legitimate barcode.

6 Claims, 11 Drawing Sheets

10

METHOD FOR DETECTING FORGED BARCODES

FIELD OF THE INVENTION

The present invention relates to fraud detection and in particular to a method of detecting forged two-dimensional barcodes.

BACKGROUND OF THE INVENTION

The postal services of many countries around the world permit and/or require the printing of evidence of postage payment, such as a postal indicium, that includes a two-dimensional barcode. Such indicia are commonly referred to as Digital Postage Marks (DPM). For example, the United States Postal Service has implemented a program known as the Information Based Indicia Program (IBIP) which permits a user to generate a postage indicium for sending a mailpiece (e.g., letter, package, etc.) that includes a human readable portion and a machine readable portion in the form of a two-dimensional barcode, such as, without limitation, a Data Matrix symbol.

As is known, a two-dimensional barcode, such as a Data Matrix symbol, typically consists of a number of data regions having nominally square modules arranged in an array, wherein each module generally represents one bit of data. For a black on white Data Matrix symbol, for instance, a darkened (i.e., filled) module represents a binary "one" and a light (e.g., empty) module represents a binary "zero." Each darkened module typically consists of multiple printed pixels (e.g., in the case of ink jet printing, multiple drops of ink). For example, a darkened module may consist of 25 pixels arranged in a 4×4 or 5×5 pixel pattern. The data regions in a two-dimensional barcode are usually surrounded by a finder pattern which, in turn, is surrounded by a quiet zone border. In addition, multiple data regions may be separated by an alignment pattern.

FIG. 1 illustrates an exemplary "empty" 40×40 Data Matrix symbol 10. More specifically, the symbol 10 shown in FIG. 1 includes 40 rows and 40 columns of modules 11. The left-most column 12 and the bottom-most row 13 of the symbol 10 form an "L" shaped boundary, often referred to as the finder pattern, which is employed to locate the symbol 10, to determine the physical size and orientation of the symbol 10 and/or to determine whether the symbol 10 was distorted when printed. The top-most row 14 and right-most column 15 of the symbol 10 consist of alternating dark and light modules 11 which are employed to define the cell structure of the symbol 10 and/or to assist in determining the physical size and distortion of the symbol 10. As seen in FIG. 1, the symbol 10 is divided into four data regions 16*a*-16*d* by a vertical alignment bar 17 and a horizontal alignment bar 18, also sometimes referred to as a finder pattern. As shown in FIG. 1, each data region 16*a*-16*d* is comprised of 18 rows and 18 columns of modules 11. FIG. 2 illustrates the Data Matrix symbol 10 of FIG. 1 with information encoded and stored within the four data regions 16*a*-16*d*. A detailed description of the Data Matrix symbology can be found in ISO/IEC International Standard 16022:2000(E) entitled "Information Technology—International Symbology Specification—Data Matrix".

Because the two-dimensional barcodes included in DPMs represent value, and are thus a type of currency, it is tempting to for fraudsters to copy a valid barcode and reuse it on other mailpieces. Even if a system of detection of duplicates is in place at the postal facilities (such as recording the barcodes going through and matching them against a database of all previously recorded barcodes), a number of ways of avoiding detection are possible. For example, the fraudster could send the illegitimate copy of the barcode first and the legitimate barcode afterward, making prosecution practically impossible. Alternatively, the fraudster could send all copies of the barcode at the same time from different locations so that the copies would be processed before the database is updated.

Thus, it is desirable to protect such barcodes against copying. One known way to protect documents and/or images against copying is to use a watermark therein. However, common watermarks provide inadequate protection against two-dimensional barcode copying for at least two reasons. First, most two-dimensional barcodes are a simple graphic printed with a low resolution printer onto an envelope or other paper that has varying and uncontrolled quality. It is therefore difficult to create and adequately hide (i.e., make invisible to the eye) a watermark that is able to withstand the inevitable resulting print quality variation that occurs. Second, not only does the watermark need to be invisible to the eye, but it must also be invisible to the barcode reader (i.e., not effect the reading of the barcode). This requires a higher print quality than is possible with the low resolution printers and paper that are most commonly used. Moreover, a two-dimensional barcode, such as a Data Matrix symbol, is such a simple graphic that the preferred way to produce a copy is not, as with other "natural images," to do a high quality scan and reprint, but instead is to simply reproduce the barcode (for instance to read the barcode with a barcode reader and regenerate the barcode). Thus, copy detection methods, such as watermark copy detection methods, based on the measure of entropy change during print and scan are inadequate to protect against many fraud efforts.

SUMMARY OF THE INVENTION

In one embodiment, the invention provides a method of determining whether a printed barcode is a forgery of a legitimate barcode, wherein the legitimate barcode is printed by a print head by moving a print medium relative to the print head along a first axis. The print head is preferably tilted from a second axis perpendicular to the first axis by an angle $\alpha$. As a result, the legitimate barcode has a first edge portion that is tilted with respect to the second axis by the angle $\alpha$. The method includes obtaining an electronic image of the printed barcode, determining from the image a first scanned edge portion and a second scanned edge portion, determining an angle R2 of the first scanned edge portion relative to a first scanner axis, determining an angle R1 of the second scanned edge portion relative to a second scanner axis perpendicular to the first scanner axis, determining a tilt angle R1-R2, and determining that the printed barcode is a forgery if the tilt angle is not substantially equal to the angle $\alpha$. In this manner, the method facilitates the detection of a low level forgery that consists of a reproduction (i.e., a read and regeneration) and subsequent printing of the legitimate barcode using a printer with a non-tilted print head by a fraudster that is not aware of the tilt in the original legitimate barcode.

The method may further include determining a first variance in a plurality of first grey levels obtained from the second scanned edge portion in the image, and determining that the printed barcode is a forgery if the first variance is greater than a predetermined threshold value. The method may further include determining a second variance in a plurality of second grey levels obtained from the first scanned edge portion in the image, and determining that the printed barcode is a forgery if one or both of, or an average of, the first variance and the second variance is greater than the predetermined threshold value. In this manner, the method facilitates the detection of a low level forgery that consists of a simple scan and reprint of a legitimate barcode which, as is known, inevitably increases the variance in the tilted edge of the barcode.

In one particular embodiment, the step of obtaining an electronic image of the printed barcode includes scanning the printed barcode with a scanner having a scanning grid. In this embodiment, the second scanned edge portion at least partially covers a first column of pixels and a second column of pixels of the scanning grid when the image is created, and the method may further include determining the angle R1 by generating a first greyness curve for the first column and a second greyness curve for the second column, measuring a distance D equal to the number of pixels between a first pixel in the first column having a pre-selected greyness value from the first greyness curve and a second pixel in the second column having the same pre-selected greyness value from the second greyness curve, and calculating the angle R1 according to the following formula: $\pi/2-\arctan(D/d)$, wherein d is the number of pixels separating the first column and the second column. Also in this embodiment, the first scanned edge portion at least partially covers a first row of pixels and a second row of pixels of the scanning grid when the image is created, and the method may further include determining the angle R2 by generating a third greyness curve for the first row and a fourth greyness curve for the second row, measuring a distance D2 equal to the number of pixels between a first pixel in the first row having a second pre-selected greyness value from the third greyness curve and a second pixel in the second row having the second pre-selected greyness value from the fourth greyness curve, and calculating the angle R2 according to the following formula: $\pi/2-\arctan(D2/d2)$, wherein d2 is the number of pixels separating the first row and the second row.

In another embodiment, the invention provides a method of determining whether a printed barcode is a forgery of a legitimate barcode, wherein the legitimate barcode is printed by a print head by moving a print medium relative to the print head along a first axis, and wherein the print head is tilted from a second axis perpendicular to the first axis. The method includes obtaining an electronic image of the printed barcode that includes a plurality of pixels, and detecting an edge portion of the printed barcode (e.g., the left positioning bar) in the electronic image, wherein the edge portion includes a plurality of columns of the pixels in the image. The method further includes creating a gradient profile for each of the plurality of columns, removing noise from each of the gradient profiles to create a plurality of smoothed gradient profiles, creating a strain vector from the smoothed gradient profiles, and determining whether the printed barcode is a forgery based on the strain vector. In this manner, the method facilitates the detection of a higher level forgery by a fraudster that is aware of the tilt in the original legitimate barcode and that digitally tilts/shears and image of the barcode (with software like Photoshop or the like) and prints the sheared image of the barcode using a printer with a non-tilted print head in an effort to mimic the tilt present in the legitimate barcode.

The method may further include detecting a second edge portion of the printed barcode (e.g., the bottom positioning bar) in the electronic image, wherein the second edge portion includes a plurality of rows of the pixels in the image, and creating a gradient profile for each of the plurality of rows. In this case, the steps of removing noise from each of the gradient profiles to create a plurality of smoothed gradient profiles and creating a strain vector from the smoothed gradient profiles also applies to the gradient profiles created for each of the rows.

Preferably, the step of determining whether the printed barcode is a forgery based on the strain vector comprises applying a decision algorithm to the stain vector that is based on experimental data relating to a plurality of legitimate test barcodes and a plurality of forged test barcodes. Also, the step of removing noise from each of the gradient profiles preferably comprises applying a noise removal algorithm, such as an anisotropic diffusion filter, to each of the gradient profiles as described, for example, in "Scale-Space and Edge Detection Using Anisotropic Diffusion," IEEE Transactions on Pattern Analysis and Machine Intelligence. Vol. 12. No. 7. July 1990.

Furthermore, the steps of detecting the edge portion and the second edge portion of the printed barcode in the electronic image preferably comprises calculating a horizontal gradient and a vertical gradient for each of the pixels and identifying the plurality of rows and the plurality of columns based on the horizontal gradients and the vertical gradients. Also, the step of creating a gradient profile for each of the plurality of rows and each of the plurality of columns preferably comprises plotting, for each one of the rows, the vertical gradients of the pixels included in the row and plotting, for each one of the columns, the horizontal gradients of the pixels included in the column. Finally, the step of creating a strain vector from the smoothed gradient profiles preferably comprises: for each of the smoothed gradient profiles, (i) evaluating a curvature at a plurality of points in the smoothed gradient profile, (ii) identifying a predetermined number of the points having a curvature absolute value that exceeds a predetermined level, (iii) measuring a deformation between each consecutive ones of the predetermined number of the points, and (iv) identifying a plurality of major deformations from the measured deformations; and constructing the strain vector from the major deformations identified for each of the smoothed gradient profiles.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

The present invention provides a method of printing a two-dimensional barcode, such as a Data Matrix symbol, by slightly tilting the print head, which results in slightly tilted barcode, that facilitates the detection of various types of forgery attempts including: (i) a low level forgery of the barcode that consists of a simple scan and reprint of the barcode (which, as is known, inevitably increases the variance in the tilted edge of the barcode), (ii) a low level forgery of the barcode that consists of a reproduction (i.e., a read and regeneration) and subsequent printing of the barcode using a printer with a non-tilted print head by a fraudster that is not aware of the tilt in the original barcode (and thus the tilt in the legitimate print head used to create the original barcode), and (iii) a higher level forgery of the barcode by a fraudster that is aware of the tilt in the original barcode and that digitally tilts/shears the barcode (with software like Photoshop or the like) and prints the barcode using a printer with a non-tilted print head in an effort to mimic the tilt present in the legitimate barcode.

Figure 1:
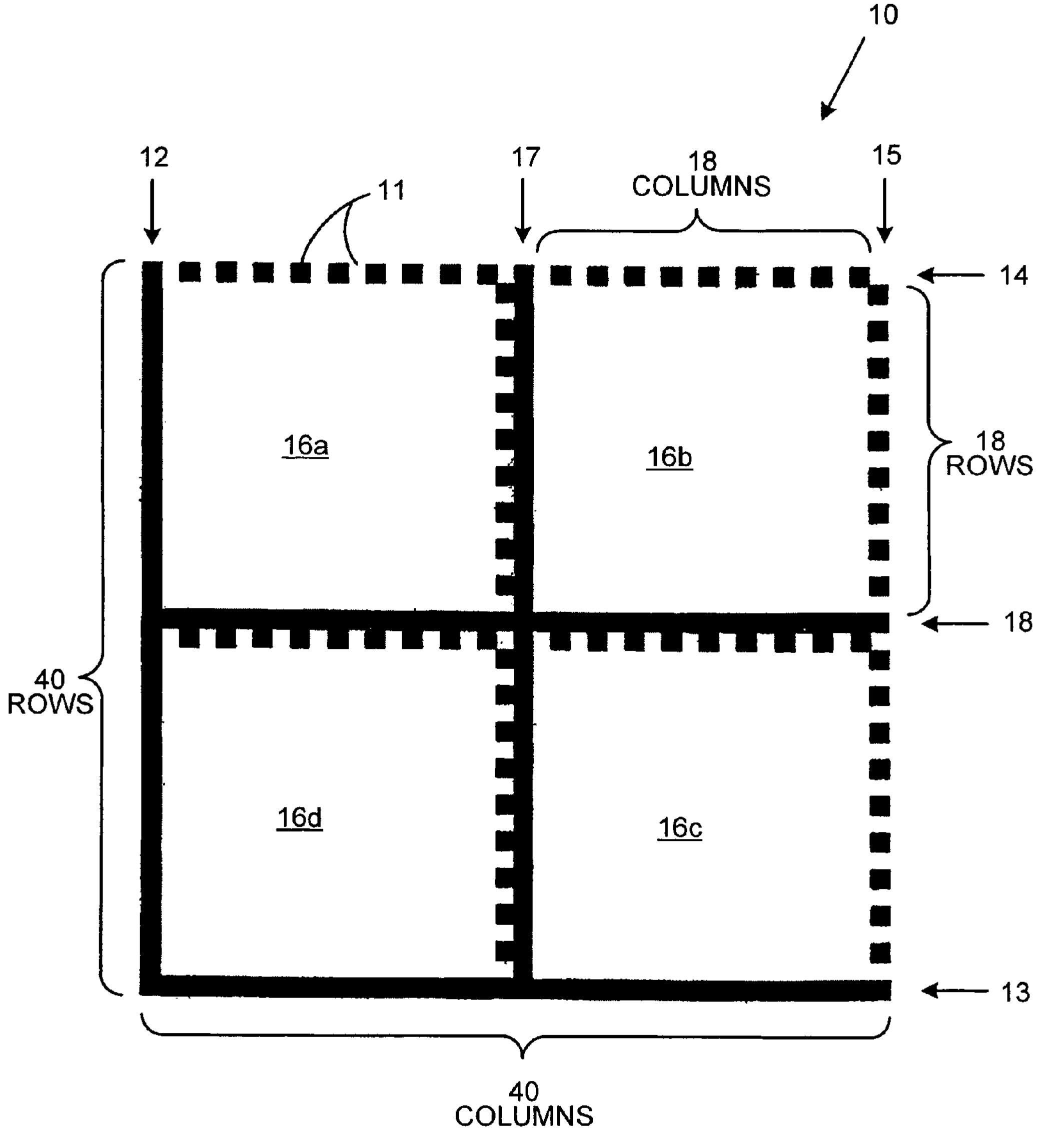
FIG. 1 (PRIOR ART)
FIG. 1 illustrates an exemplary "empty" 40×40 Data Matrix symbol.
Figures 2, 3:
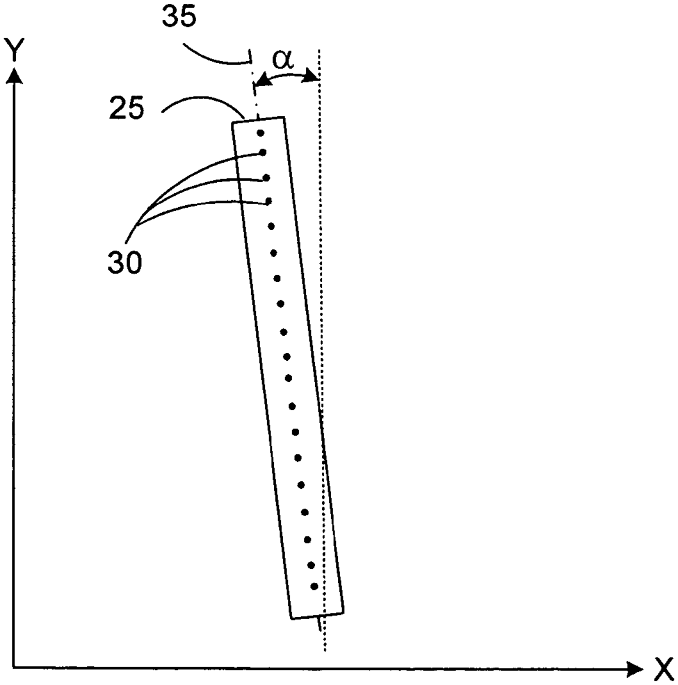
FIG. 2 (PRIOR ART)
FIG. 2 illustrates the Data Matrix symbol of FIG. 1 with information encoded and stored within the four data regions included therein.
FIG. 3 is a schematic representation of a print head for printing a tilted barcode according to an aspect of the present invention.
Figure 4:
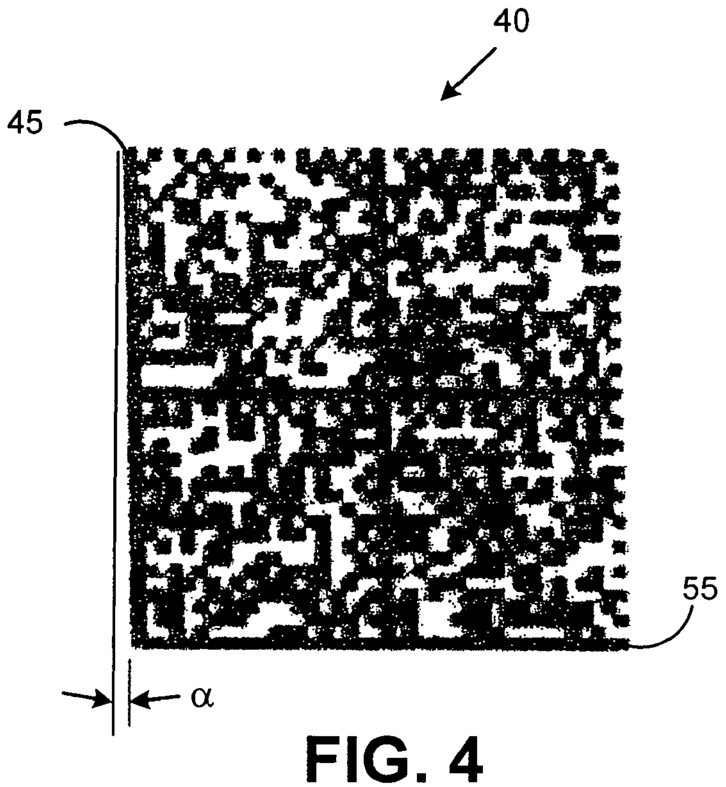
FIG. 4 is a schematic representation of a two-dimensional barcode printed using the print head shown in FIG. 3.
Figure 5:
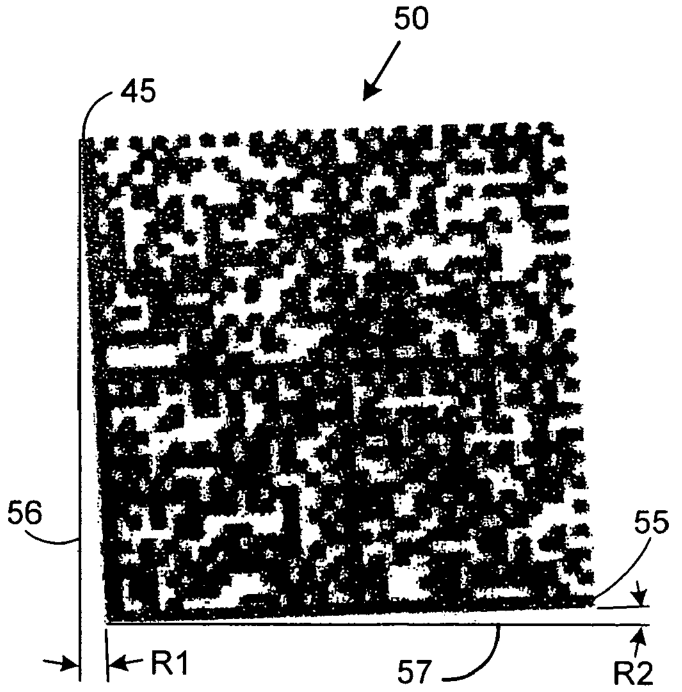
FIG. 5 is a schematic representation of an electronic image of the two-dimensional barcode shown in FIG. 4.

FIG. 3 is a schematic representation of a print head 25 having a plurality of nozzles or print elements 30 aligned along an axis 35 for printing a tilted barcode according to an aspect of the present invention. The print head 25 is adapted to print on a print medium, such as an envelope, that moves relative to the print head 25 in the X or first axis direction shown in FIG. 3. In addition, as seen in FIG. 3, the print head 25, and in particular the axis 35, is tilted with respect to the vertical (Y) axis or second axis at an angle α. Preferably, the angle α is on the order of 1-3 degrees. As a result, and as shown in FIG. 4, when a two-dimensional barcode 40, such as a Data Matrix symbol, is printed using the print head 25, the left edge of the left positioning bar or second edge portion 45 of the finder pattern of the two-dimensional barcode 40 is tilted from vertical at an angle equal to α. As will be appreciated by those of skill in the art, when the two-dimensional barcode 40 printed as described above is later scanned, the two-dimensional barcode 40 may not be perfectly aligned with the scanning grid of the scanner that is used, bit instead may be slightly rotated with respect to the scanning grid. In other words, the printing grid of the printer used to print the two-dimensional barcode 40 may be rotated with respect to the scanning grid of the scanner that is used. As is known, the scanning grid and the printing grid each typically comprise an array of square elements, with each element being a single pixel. As a result, the image 50 (creating by the scanning step) of the two-dimensional barcode 40 will in many cases appear as shown in FIG. 5, wherein the left edge of the left positioning bar 45 of the finder pattern of the two-dimensional barcode 40 is tilted from the vertical second scanner axis 56 at an angle equal to R1 and the bottom edge of the bottom positioning bar 55 of the finder pattern of the two-dimensional barcode 40 is tilted from the horizontal first scanner axis 57 at an angle equal to R2. As a result of the additional rotation, the angle R1 will be greater than the angle α. FIG. 3 shows a printhead 25 tilted at an angle α in order to produce a printed line at an angle α by firing multiple print elements 30 simultaneously. In an alternative embodiment, the printhead 25 can be aligned with the Y axis and each print element 30 fired with a delay proportional to the vertical position of the print element, the delay being equal to $dt_i=\tan(\alpha)y_i/V$ where $y_i$ is the position of the ith print element, V is the relative speed of the paper and printhead, and $dt_i$ is the firing delay for the ith print element. The resolution of the delay $dt_i$ can be much finer than the column to column delay, resulting in smooth lines similar to those produced by angled printhead 25.

According to a further aspect of the invention, a method of determining the angles R1 and R2 from the image 50 using the left positioning bar or second edge portion 45 and the bottom positioning bar or first edge portion 55 is provided. From those angles R1 and R2, it is possible to determine the angle α by subtracting R2 from R1. As described elsewhere herein, according to an aspect of the present invention, the determination of the angle α is used to detect forged barcodes.

Figure 6:
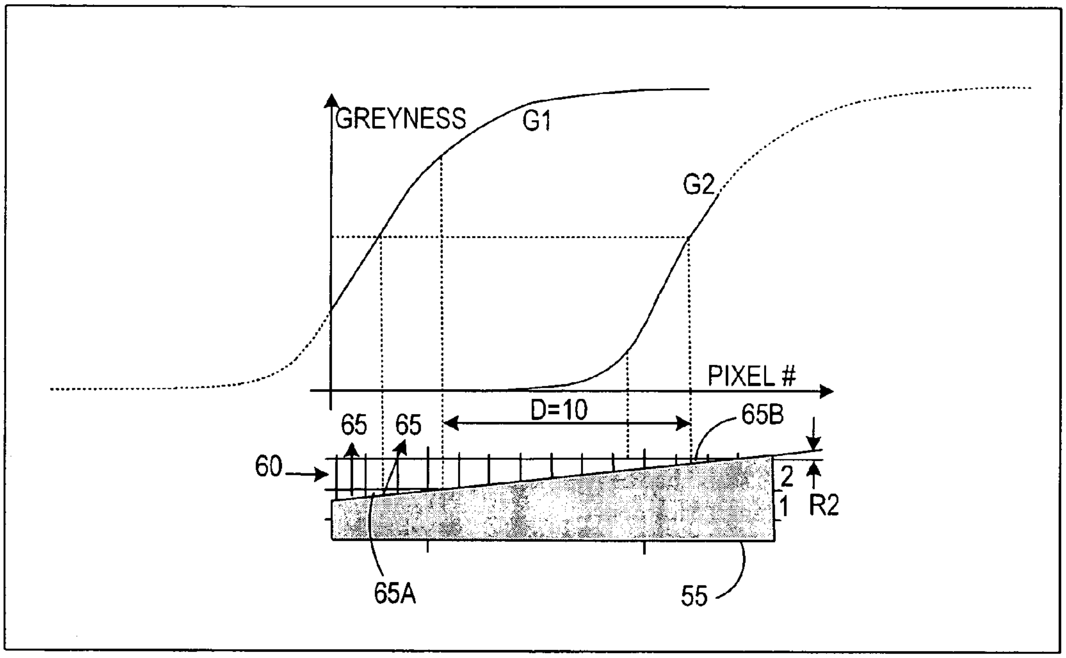
FIG. 6 is a schematic representation of a portion of the scanning grid and a portion of the image of FIG. 5 that may be used to implement a portion of an embodiment of the method of FIG. 7.

With respect to the determination of the angles R1 and R2, FIG. 6 shows a portion of the scanning grid 60 of the scanner used to create the image 50 including a plurality of pixels 65. The portion of the scanning grid 60 shown in FIG. 6 includes certain of the pixels 65 from a row 1 and a row 2 of the scanning grid 60. FIG. 6 also shows a portion of the bottom positioning bar or first edge portion 55. As seen in FIG. 6, bottom positioning bar 55 is positioned at angle R2 with respect to the longitudinal axis of the rows 1 and 2 of the scanning grid 60.

According to an aspect of the invention, the angle R2 may determined in the following manner. First, a greyness curve for row 1 and row 2 (G1 and G2, respectively) is calculated and plotted as shown in FIG. 6. In each case, the greyness curve is a plot of the measured greyness (from the scanned image 50) on the Y-axis versus the pixels in the respective row on the X-axis. In other words, the greyness curve provides a greyness value (Y-axis) ranging from 0 to 1 for each pixel 65 (X-axis) in the row of the scanning grid in question. In the preferred embodiment, the greyness value for each pixel 65 is determined by the following formula: greyness=1−(the grey level of the scanned pixel in question), wherein the grey levels for each pixel have been converted from a 0 to 255 scale to a 0 to 1 scale (by dividing each grey scale value by 255), and wherein a grey scale value of 0 is white and a grey scale value of 1 is black. The next step in determining the angle R2 involves measuring a distance D that is equal to the number of pixels between a first pixel in row 1 (e.g., pixel 65A in FIG. 6) having a pre-selected greyness value (e.g., 0.5) and a second pixel in row 2 (e.g., pixel 65B in FIG. 6) having the same pre-selected greyness value (e.g., 0.5). The angle R2 may then be determined according to the following formula: $R2=\pi/2-\arctan(D)$. In addition, the rows 1 and 2 need not be directly adjacent to one another (as shown in FIG. 6), but instead may be separated from one another by a number of pixels equal to d. In such a case, the formula that is used is as follows: $R2=\pi/2-\arctan(D/d)$. This process is then repeated for the left positioning bar 45 to obtain the angle R1 (in which case rows of pixels are switched for columns of pixels in the processing).

Figure 7:
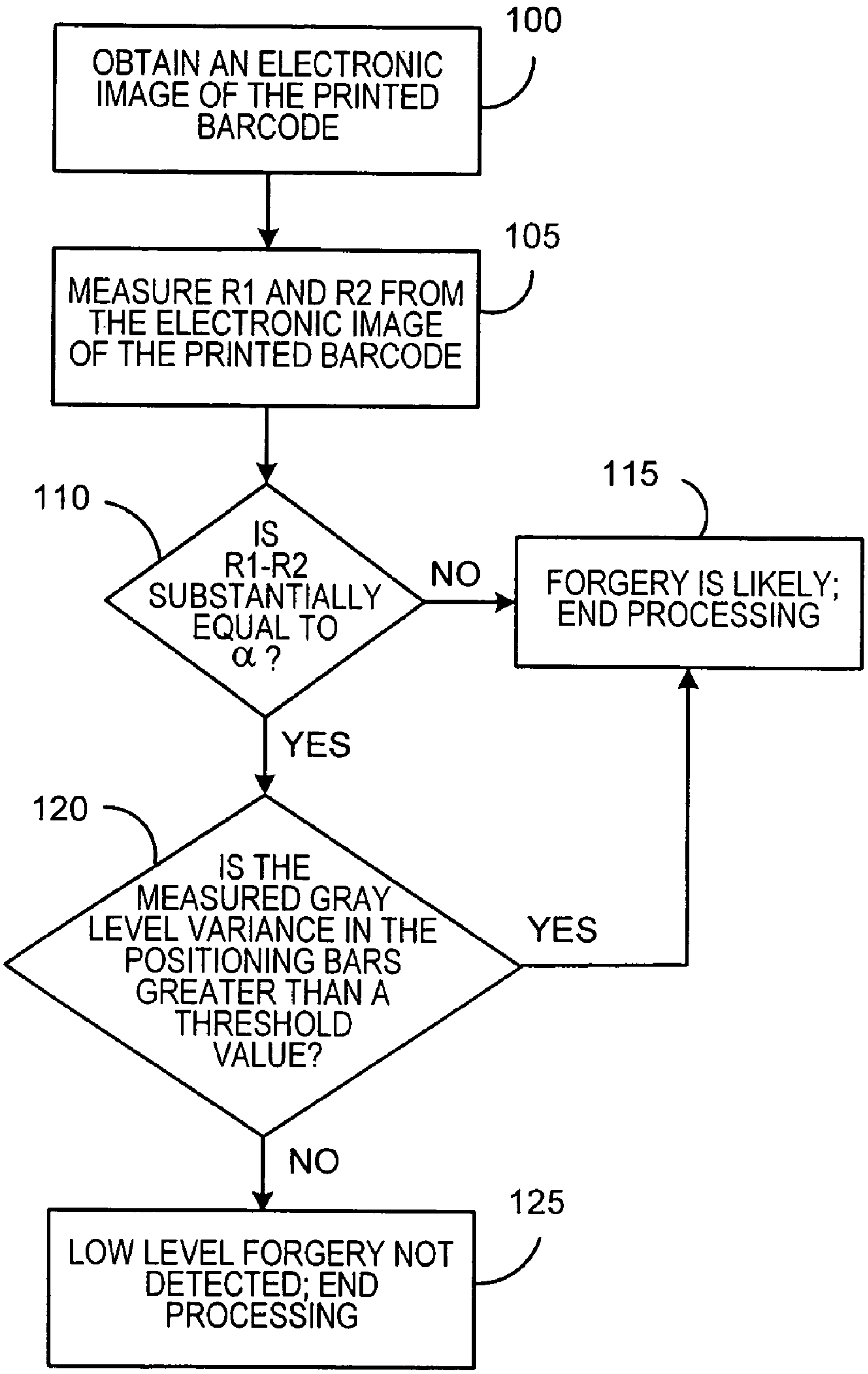
FIG. 7 is a flowchart showing an embodiment of a method for determining whether a two-dimensional barcode, such as a Data Matrix symbol, purported to have been printed by a legitimate printer having a print head tilted at an angle α as shown in FIG. 3 is actually a forgery resulting from either of the two low level forgery techniques described elsewhere herein.

FIG. 7 is a flowchart showing an embodiment of a method for determining whether a two-dimensional barcode, such as a Data Matrix symbol, purported to have been printed by a legitimate printer having a print head 25 tilted at an angle α as shown in FIG. 3 is actually a forgery resulting from either of the two low level forgery techniques described elsewhere herein. As described above, in a printed legitimate two-dimensional barcode, the left positioning bar 45 of the finder pattern would be tilted from vertical at an angle equal to α. The method begins at step 100, where an electronic image (e.g., image 50 in FIG. 5) of the printed two-dimensional barcode to be tested is obtained. Preferably, the image is obtained by scanning the printed version of the barcode using a scanner having a scanning grid as described elsewhere herein. As a result, there is likely to be some rotation of the scanning grid with respect to the printing grid of the printer that printed the barcode to be tested. Next, at step 105, the angles R1 (the tilt of the left positioning bar 45 from vertical) and R2 (the tilt of the bottom positioning bar 55 from horizontal) are measured in the manner described in connection with FIG. 6. At step 110, a determination is made as to whether the difference between R1 and R2 is substantially equal to (i.e., with in some predetermined acceptable threshold amount) the angle α (as will be appreciated by those of skill in the art, the difference between R1 and R2 will provide the tilt of the left positioning bar 45 when the bottom positioning bar 55 is aligned with horizontal, as would be the case of the printed but not scanned barcode). If the answer at step 110 is no, then, as shown at step 115, then it is likely that the barcode in question is a forgery and the processing ends. In particular, if the answer at step 110 is no, then it is likely that the barcode in question is a low level forgery of the barcode that consists of a reproduction (i.e., a read and regeneration) and subsequent printing of the barcode using a printer with a non-tilted print head by a fraudster that is not aware of the tilt in the original barcode. If the answer at step 110 is yes, then, at step, 120, a determination is made as to whether the variance in the grey levels of the left positioning bar 45 and the right positioning bar 55 exceed some predetermined threshold value. As will be appreciated by those of skill in the art, variance in excess of a certain level is an indication that the barcode in question is a low level forgery that consists of a simple scan and reprint of a legitimate barcode which, as is known, inevitably increases the variance in the tilted edge of the barcode. Thus, if the answer at step 120 is yes, then the method returns to step 115 and the processing ends. If, however, the answer at step 120 is no, then that means that the barcode in question is likely not one of the two types of low level forgeries described herein and the method proceeds to step 125 and the processing ends.

Figure 8A:
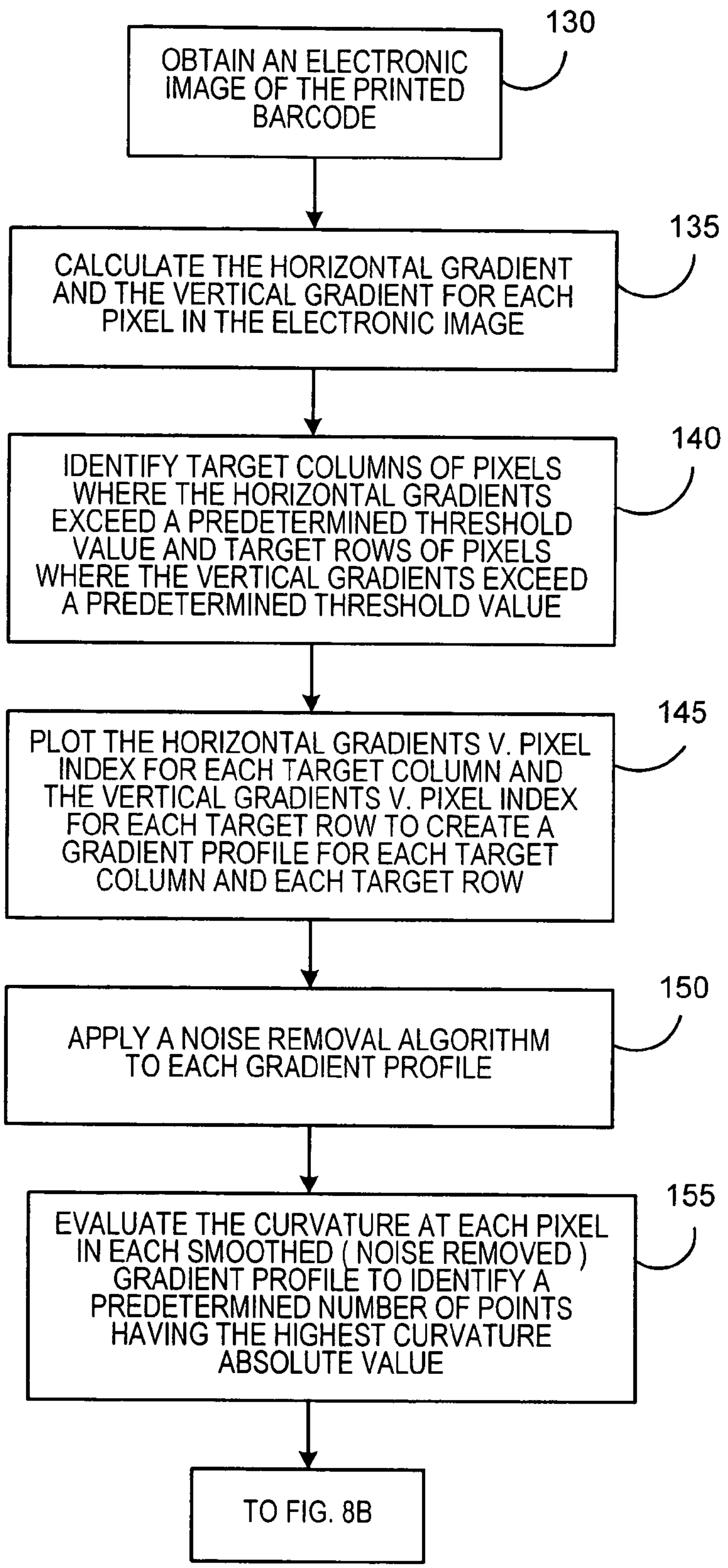
FIGS. 8A and 8B are a flowchart showing an embodiment of a method for determining whether a two-dimensional barcode, such as a Data Matrix symbol, purported to have been printed by a legitimate printer having a print head tilted at an angle α as shown in FIG. 3 is actually a forgery resulting from the higher level forgery technique described elsewhere herein wherein the image includes digital shearing.
Figure 8B:
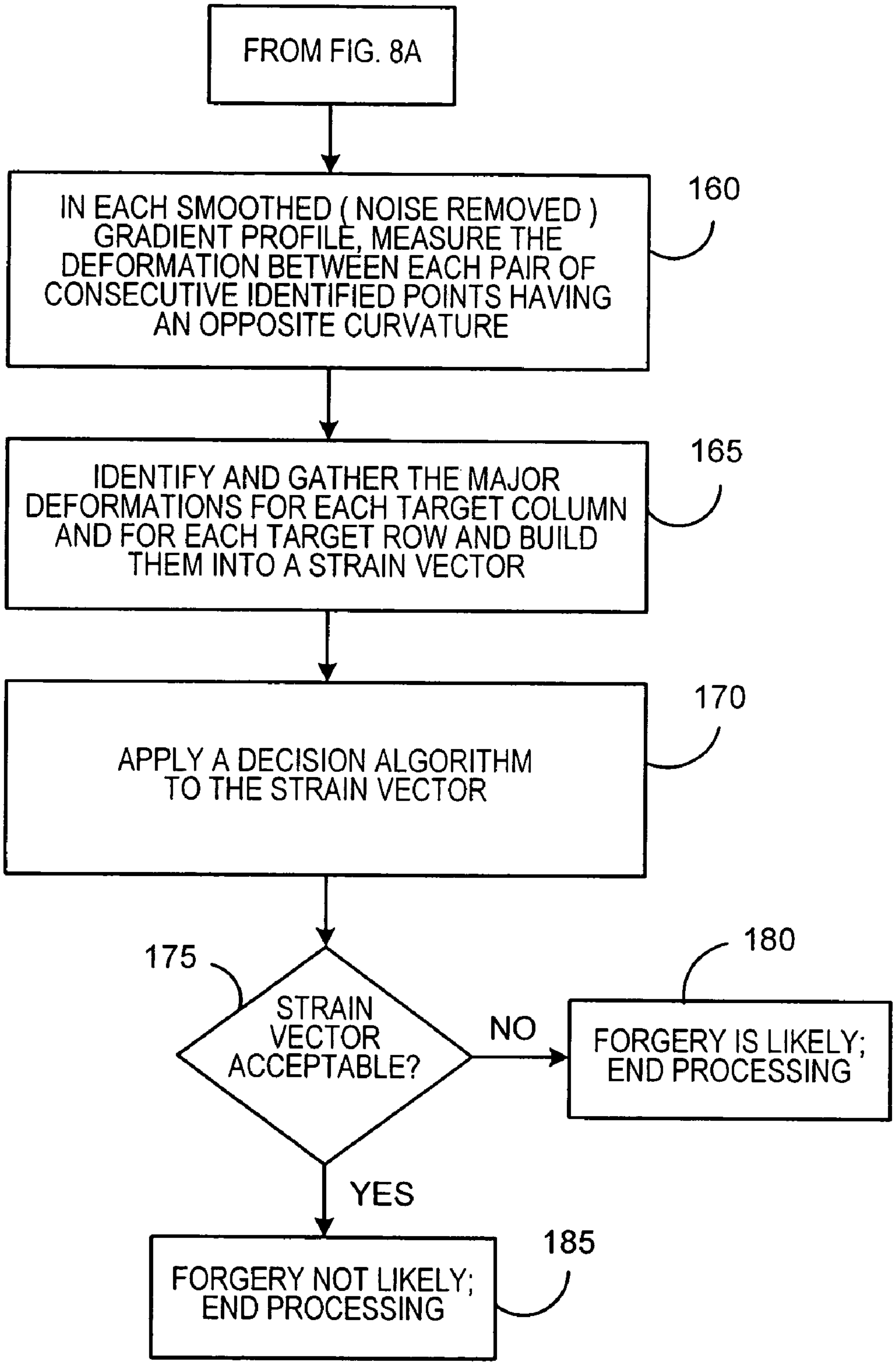
Figure 9:
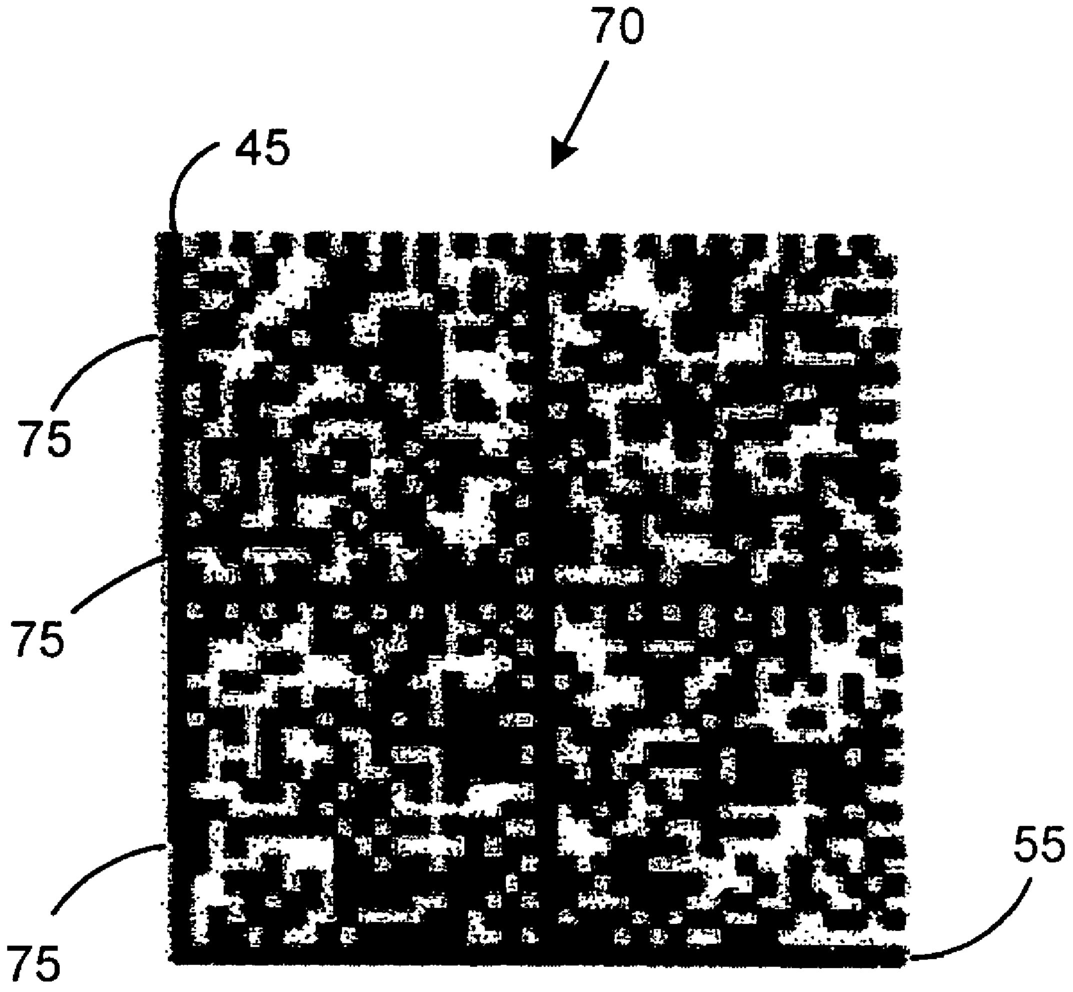
FIG. 9 is a schematic representation of an example of a printed digitally sheared barcode.

FIGS. 8A and 8B are a flowchart showing an embodiment of a method for determining whether a two-dimensional barcode, such as a Data Matrix symbol, purported to have been printed by a legitimate printer having a print head 25 tilted at an angle α as shown in FIG. 3 is actually a forgery resulting from a higher level forgery of the barcode by a fraudster that is aware of the tilt in the original barcode and that digitally tilts/shears the barcode (with software like Photoshop or the like) and prints the barcode using a printer with a non-tilted print head in an effort to mimic the tilt present in the legitimate barcode. Digitally tilting/shearing of a barcode is typically done by pushing certain pixels in the left positioning bar 45 over with respect to other pixels therein in a stepwise fashion. When printed, the steps become less perceptible due to the distortion that naturally occurs during printing. An example of a printed digitally sheared barcode 70 is shown in FIG. 9. As seen in FIG. 9, if one looks closely, some stepped portions 75 can be seen. The goal of the method of FIG. 8 is to detect certain artifacts of the digital tilting/shearing and therefore detect such forgeries.

The method begins at step 130, where an electronic image of the printed two-dimensional barcode to be tested is obtained. Next, at step 135, the horizontal gradient and the vertical gradient for each pixel in the electronic image obtained in step 130 is calculated. In each case, the horizontal gradient for each pixel is determined by calculating the difference between the grey level of the pixel and the grey level of the pixel immediately to the right of the pixel. Similarly, the vertical gradient for each pixel is calculated by determining the difference between the grey level of the pixel and the grey level of the pixel immediately above it. At step 140, certain target columns and target rows of pixels are identified. In particular, the target columns are a predetermined number of columns where the horizontal gradients, as calculated in step 135, for the pixels in that column on average exceed a certain predetermined threshold value. Similarly, the target rows are those rows where the vertical gradients calculated in step 135 on average exceed a certain predetermined threshold value. The actions performed in step 140 are aimed at detecting the left positioning bar 45 and the bottom positioning bar 55 of the barcode in the electronic image obtained in step 130. Preferably, the predetermined threshold value that is utilized in step 140 is on the order of 0.4. In step 140, the first such columns moving left to right and the first such rows moving bottom to top that exceed the threshold value are those that are identified.

Figure 10A:
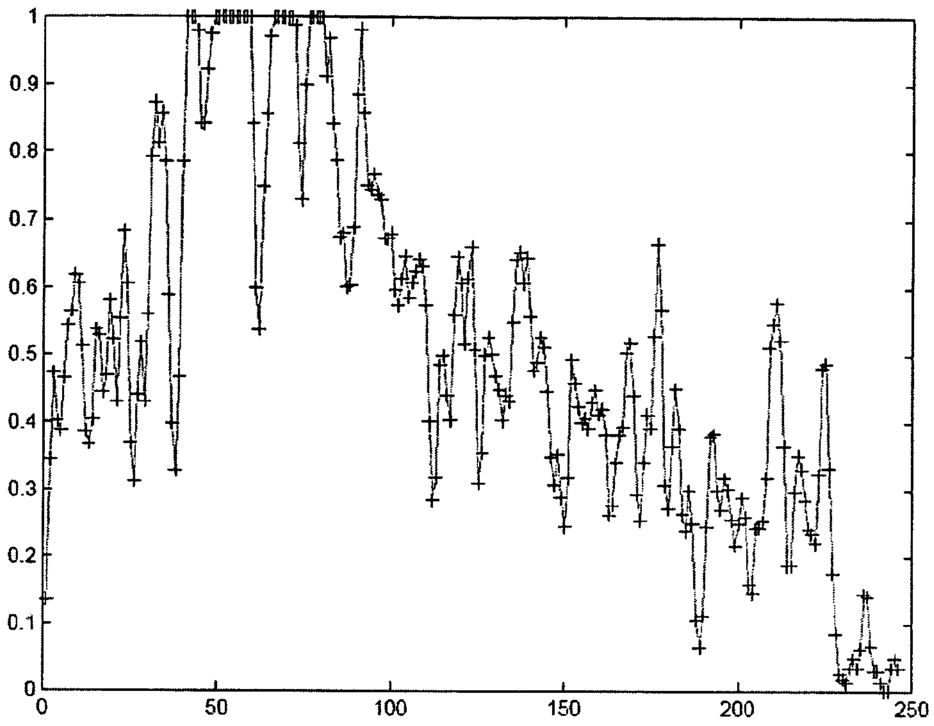
FIG. 10A shows a gradient profile that would result from an image of a legitimate barcode and FIG. 10B shows a gradient profile that would result from a forged barcode that includes digital shearing during the processing of the method shown in FIGS. 8A and 8B.
Figure 10B:
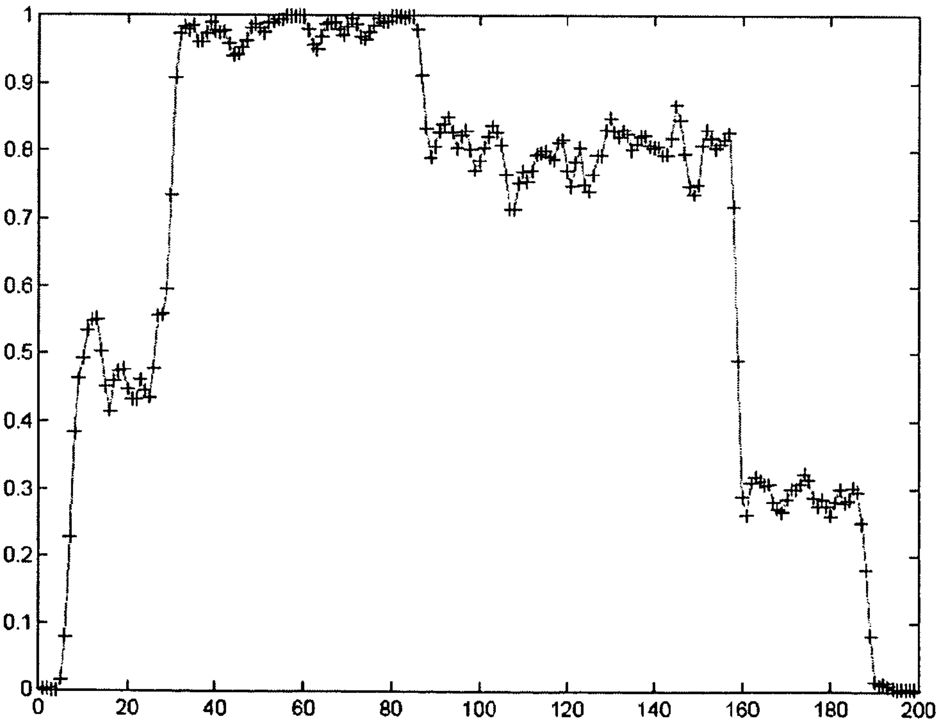
Figure 11A:
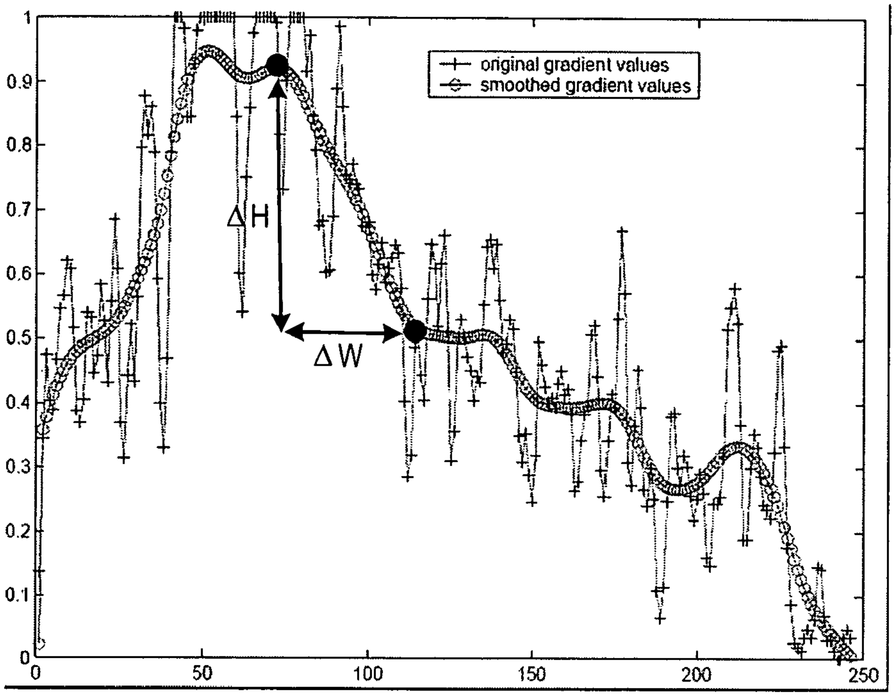
FIG. 11A shows an example of a smooth gradient profile for a legitimate barcode and FIG. 11B shows an example of a smooth gradient profile for a forged barcode produced by digital shearing that may be generated during the processing of the method shown in FIGS. 8A and 8B.
Figure 11B:
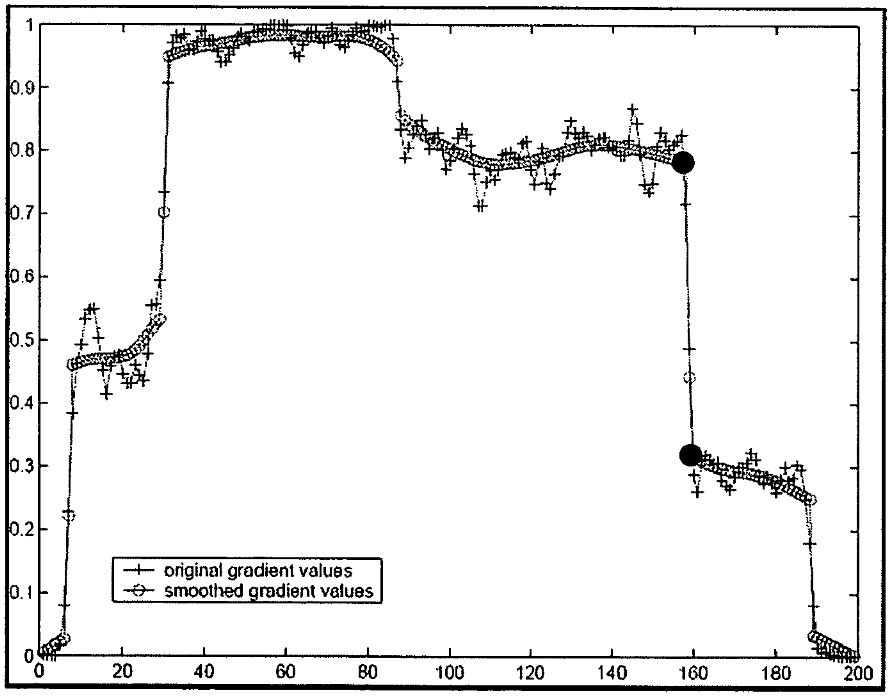

Next, at step 145, the horizontal gradients for each identified target column are plotted versus pixel index and the vertical gradients for each identified target row are plotted versus pixel index to create a gradient profile for each target column and each target row. FIG. 10A shows a gradient profile that would result from an image of a legitimate barcode and FIG. 10B shows a gradient profile that would result from a forged barcode that includes digital shearing. In the gradient profiles, the gradient values are plotted on the vertical axis and the pixel index is plotted on the horizontal axis. Then, at step 150, a noise removal algorithm is applied to each gradient profile. Preferably, the noise removal algorithm that is applied is a known anisotropic diffusion filter algorithm. The application of the noise removal algorithm will result in a smoothed gradient profile for each target column and each target row. FIG. 11A shows an example of a smoothed gradient profile for a legitimate barcode and FIG. 11B shows an example of a smoothed gradient profile for a forged barcode produced by digital shearing (FIG. 11A is the smoothed version of the profile of FIG. 10A and FIG. 11B is the smoothed version of the profile of FIG. 10B).

Figure 12:
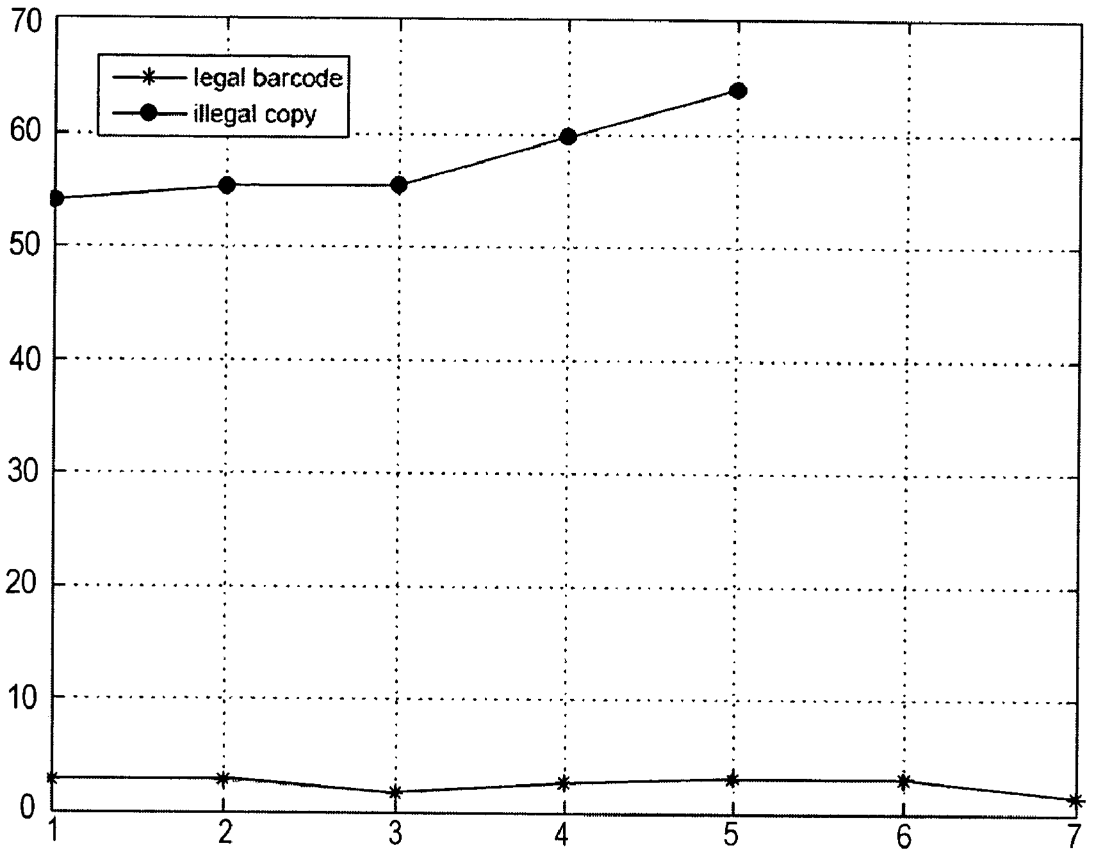
FIG. 12 shows a plot of strain features determined during the processing of the method shown in FIGS. 8A and 8B for both a legitimate barcode and a forged barcode that includes digital shearing.

At step 155, the curvature at each pixel in each smoothed gradient profile is evaluated to identify a predetermined number of points on the profile that have the highest curvature absolute value. Preferably, the points that are identified consist of all of those points having a curvature absolute value that exceed some predetermined value. For example, that value may be chosen such that the number of points as identified will be on the order of about 10. Next, referring to FIG. 8B, at step 160, in each smoothed gradient profile, the deformation (i.e., the slope) between each pair of consecutive identified points (step 155) having an opposite curvature is measured. Then, at step 165, the major deformations for each target column and each target row are identified and gathered and built into a strain vector. The major deformations consist of those deformation values that exceed a certain predetermined threshold value. FIG. 12 shows a plot of strain features determined in step 165 for both a legitimate barcode and a forged barcode that includes digital shearing.

At step 170, a decision algorithm is applied to the strain vector, and at step 175, a determination is made, based on the outcome of the decision algorithm, as to whether the strain vector is acceptable. If the answer at step 175 is no, then, at step 180, that means that a forgery is likely and the processing ends. If, however, the answer at step 175 is yes, then, as indicated at step 185, that means that a forgery is not likely, and the processing ends. Preferably, the decision algorithm that is applied to the strain vector is based on experimentation wherein a large number of legitimate barcodes and a large number of forged barcodes are processed as described herein and the resulting strain vectors are analyzed in order to determine those features that should be used to determine what type of strain vector indicates a forgery. A number of known techniques for generating and applying such a decision algorithm are well known and thus will not be described herein. Thus, the method shown in FIGS. 8A and 8B analyze the image of a barcode in question to determine whether or not the image includes aspects and features therein indicating the existence of digital shearing and therefore the likelihood of a forgery.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of determining whether a printed barcode is a forgery of a legitimate barcode, wherein said legitimate barcode is printed by a print head by moving a print medium relative to said print head along a first axis, the method comprising:

obtaining an electronic image of said printed barcode wherein by scanning said printed bar code with a scanner having a scanning grid columns of printed pixels produced by said print head are tilted from a second axis perpendicular to said first axis by an angle α, and wherein said legitimate barcode has a first edge portion that is parallel to said first axis and a second edge portion that is tilted with respect to said second axis by said angle α and said second scanned edge portion at least partially covers a first column of pixels and a second column of pixels of said scanning grid, determining from said image a first scanned edge portion and a second scanned edge portion;

determining an angle R2 of the first scanned edge portion relative to a first scanner axis;

determining an angle R1 of the second scanned edge portion relative to a second scanner axis perpendicular to the first scanner axis; by generating a first greyness curve for said first column and a second greyness curve for said second column;

measuring a distance D, said distance D being equal to the number of pixels between a first pixel in said first column having a pre-selected greyness value from said first greyness curve and a second pixel in said second column having said pre-selected greyness value from said second greyness curve; and calculating said angle R1 according to the following formula: π/2−arctan(D/d), wherein d is the number of pixels separating said first column and said second column, determining a tilt angle R1-R2; and determining that said printed barcode is a forgery if said tilt angle is not substantially equal to said angle α.

2. The method according to claim 1, wherein said step of determining that said printed barcode is a forgery if said tilt angle is not substantially equal to said angle α comprises determining that said printed barcode is a forgery if said tilt angle is more than a predetermined amount different than said angle α.

3. The method according to claim 1, further comprising determining a first variance in a plurality of first grey levels obtained from said second scanned edge portion, and determining that said printed barcode is a forgery if said first variance is greater than a predetermined threshold value.

4. The method according to claim 3, further comprising determining a second variance in a plurality of second grey levels obtained from said first scanned edge portion, and determining that said printed barcode is a forgery if one or both of said first variance and said second variance is greater than said predetermined threshold value.

5. The method according to claim 3, further comprising determining a second variance in a plurality of second grey levels obtained from said first scanned edge portion, and determining that said printed barcode is a forgery if an average of said first variance and said second variance is greater than said predetermined threshold value.

6. The method according to claim 1, wherein said first scanned edge portion at least partially covers a first row of pixels and a second row of pixels of said scanning grid, and wherein said method further comprises determining said angle R2 by:

generating a third greyness curve for said first row and a fourth greyness curve for said second row;

measuring a distance D2, said distance D2 being equal to the number of pixels between a first pixel in said first row having a second pre-selected greyness value from said third greyness curve and a second pixel in said second row having said second pre-selected greyness value from said fourth greyness curve; and calculating said angle R2 according to the following formula: π/2−arctan(D2/d2), wherein d2 is the number of pixels separating said first row and said second row.

* * * * *